(12) United States Patent
Schulte

(10) Patent No.: US 8,635,829 B2
(45) Date of Patent: Jan. 28, 2014

(54) COVERING CONSISTING OF ELEMENTS THAT CAN BE MECHANICALLY INTERCONNECTED AND METHOD FOR PRODUCING ELEMENTS

(76) Inventor: Guido Schulte, Rüthen-Meiste (DE)

(*) Notice: Subject to any disclaimer, the term of this patent is extended or adjusted under 35 U.S.C. 154(b) by 0 days.

(21) Appl. No.: 13/496,114

(22) PCT Filed: Sep. 15, 2010

(86) PCT No.: PCT/DE2010/001084
§ 371 (c)(1),
(2), (4) Date: Mar. 14, 2012

(87) PCT Pub. No.: WO2011/032540
PCT Pub. Date: Mar. 24, 2011

(65) Prior Publication Data
US 2012/0174521 A1    Jul. 12, 2012

(30) Foreign Application Priority Data
Sep. 15, 2009 (DE) .......................... 10 2009 041 297

(51) Int. Cl.
*E04B 2/00* (2006.01)
(52) U.S. Cl.
USPC ............................ 52/588.1; 52/581; 52/582.1
(58) Field of Classification Search
USPC ............... 52/582.1, 582.2, 592.1, 581, 588.1; 403/409.1, 320
See application file for complete search history.

(56) References Cited

U.S. PATENT DOCUMENTS 3,572,224 A * 3/1971 Perry ............................... 404/40
3,859,000 A * 1/1975 Webster .......................... 404/41
7,121,058 B2 * 10/2006 Palsson et al. ............... 52/592.2

(Continued)

FOREIGN PATENT DOCUMENTS

DE    20 2007 018662 U1    2/2009
EP          1350 904 A2    10/2003

(Continued)

*Primary Examiner* — Brian Glessner
*Assistant Examiner* — Joshua Ihezie
(74) *Attorney, Agent, or Firm* — Henry M. Feiereisen LLC

(57) ABSTRACT

The invention relates to a covering consisting of elements that can be mechanically interconnected, at least one of the elements being a panel (1, 1*a*-1*d*, 2, 2*a*-2*d*) with the following characteristics: a) the sides (6) of the elements facing one another have a corresponding profiled section that can be used to interlock adjoining elements by means of a substantially vertical or pivoting connection movement in a horizontal and vertical direction; b) the interlocking can be achieved by a tongue element (11) that is hinged on one of the elements and that can be pivoted behind a locking edge (17) of the other element during the connection movement, said edge extending substantially in a horizontal direction; c) during the connection of adjoining elements, the tongue element (11) slides down a supporting surface (19) of the adjoining element, said surface lying opposite the locking edge (17). The supporting surface (19) that points towards the locking edge (17) is inclined in relation to a displacement plane (V) and causes a horizontal displacement of the tongue element (11, 11*a*-11*d*) behind the locking edge (17). Alternatively, the supporting surface (19) runs parallel to the displacement plane (V) and the free end (20) of the tongue element is inclined in relation to the displacement plane (V), thus causing a horizontal displacement of the tongue element (11*d*) behind the locking edge (17) during the connection of the adjoining elements (1*d*, 2*d*).

24 Claims, 6 Drawing Sheets

(56) References Cited

U.S. PATENT DOCUMENTS

| | | |
|---|---|---|
| 7,441,385 B2 * | 10/2008 | Palsson et al. .............. 52/589.1 |
| 7,980,039 B2 | 7/2011 | Groeke et al. |
| 2007/0006543 A1 * | 1/2007 | Engstrom .................... 52/582.1 |
| 2007/0028547 A1 * | 2/2007 | Grafenauer et al. ......... 52/586.1 |
| 2007/0107359 A1 * | 5/2007 | Zhang ......................... 52/582.1 |
| 2008/0110125 A1 * | 5/2008 | Pervan ........................ 52/582.2 |
| 2009/0100782 A1 * | 4/2009 | Groeke et al. ............... 52/589.1 |
| 2010/0281803 A1 | 11/2010 | Cappelle |
| 2010/0300029 A1 | 12/2010 | Braun et al. |
| 2011/0094083 A1 | 4/2011 | Schulte |
| 2011/0162312 A1 | 7/2011 | Schulte |
| 2011/0162313 A1 | 7/2011 | Schulte |
| 2011/0225921 A1 | 9/2011 | Schulte |

FOREIGN PATENT DOCUMENTS

| | | | | |
|---|---|---|---|---|
| EP | 2 034 106 A1 | 3/2009 | | |
| WO | WO 2008004960 A2 * | 1/2008 | ............. | E04F 15/02 |
| WO | WO 2009/066153 A2 | 5/2009 | | |

* cited by examiner

COVERING CONSISTING OF ELEMENTS THAT CAN BE MECHANICALLY INTERCONNECTED AND METHOD FOR PRODUCING ELEMENTS

CROSS-REFERENCES TO RELATED APPLICATIONS

This application is the U.S. National Stage of International Application No. PCT/DE2010/001084, filed Sep. 15, 2010, which designated the United States and has been published as International Publication No. WO 2011/032540 and which claims the priority of German Patent Application, Serial No. 10 2009 041 297.2, filed Sep. 15, 2009, pursuant to 35 U.S.C. 119(a)-(d).

BACKGROUND OF THE INVENTION

The invention relates to a covering made of elements that can be mechanically interconnected and to a method for producing elements.

Wall, ceiling and floor coverings, such as prefinished parquet, hardwood floors or laminate floors are constructed from several rows of panels having a largely rectangular configuration. Conventional panels have on one longitudinal side and one head face continuous grooves, and on the corresponding opposite longitudinal side or head face continuous springs which formfittingly match the grooves. The panels of two adjacent rows are arranged with a mutual offset and are installed by joining groove and spring.

It is known to provide on the grooves and springs mechanical locking means which lockingly engage in adjacent panels of the floor covering. This arrangement is intended to prevent gaps from forming in the installed floor covering due to expansion or contraction processes. Matching locking elements are formed on the groove and spring of the panels as indentations, recesses or protrusions, so as to hold connected panels in the joined position without an adhesive. Typically, the panels are rotated or latched into each other along their longitudinal sides and subsequently displaced laterally, so that the locking rails engage at the head faces. To facilitate this, gentle hammer strokes can be applied from the opposite head face by using a tamping block. There is, however, the risk that the panels can be damaged even when taking the greatest care.

Solutions are also known where in the abutting head faces need not be locked by hammer strokes, but instead by displaceable spring elements. One example is the floor covering described in DE 20 2007 018 662 U1, wherein identically constructed panels can be interlocked by a substantially vertical joining motion in the horizontal and vertical direction, whereby locking in the vertical direction is attained with at least one spring element which is movable in the horizontal direction and formed as one-piece from the core on a lateral edge, with the spring element during the joining movement locking behind a locking edge extending substantially in the horizontal direction. The at least one spring element is free with respect to the core in the direction of the top side and in the direction of the opposing side edge and is connected with the core on at least one of the two ends of its side edge. Disadvantageously, for locking the spring element, a horizontal force must first be applied to the spring element so as to push the spring element back before releasing the built-up spring tension, causing the spring element to snap into place behind the locking strip. The floor boards described in EP 1 350 904 A2 are constructed similarly, wherein the spring to be attached on a head face of a floor covering element must first be pushed back before being able to snap in place in a receptacle provided for locking. In each case, a sufficiently large clearance space must be provided behind the spring, so that the spring can be pushed back before locking.

SUMMARY OF THE INVENTION

It is therefore an object of the invention to provide a covering of mechanically interlockable elements which can be locked safely by applying only a small force. Moreover, a method for producing elements for such covering is disclosed.

According to one aspect of the invention, a covering is constructed from mechanically interconnectable elements, wherein at least one of the elements is a panel. The elements include matching profiled sections arranged on opposing sides of a panel and configured for interlocking adjacent elements with a substantially vertical joining motion or a pivoting joining motion in a horizontal and vertical direction, and at least one spring element hinged on one of the elements and configured for pivoting during the joining motion behind a locking edge of the adjacent element, with the locking edge extending substantially in the horizontal direction, a supporting surface arranged on the adjacent element facing the locking edge and configured to enable the at least one spring element to slide on the supporting surface. Either the supporting surface is inclined toward the locking edge with respect to an installation plane, causing a horizontal displacement of the at least one spring element behind the locking edge, or the supporting surface extends parallel to the installation plane and a free end of the at least one spring element is inclined with respect to the installation plane. This arrangement causes a horizontal displacement of the at least one spring element behind the locking edge when adjacent elements are joined.

The covering according to the invention includes mechanically interlockable elements, wherein at least one of the elements is a panel. Within the context of the invention, one of the elements may be constructed as a panel and the additional element as a frame component for a frame construction, for example for double floors. The following description of the invention is directed to an embodiment wherein the elements to be interlocked are panels.

The elements have a matching profiled section on their opposing sides, allowing adjacent elements to be interlocked by a substantially vertical or pivoting joining motion in the horizontal direction and in the vertical direction. When connecting the elements according to the invention, the element to be added may be swung away or pivoted away. Alternatively, the elements may be interlocked by a substantially or an exclusively vertical motion. The opposing sides, which according to the invention are provided with a matching profiled section, are in particular head faces of the elements. The profiled section may in principle be provided on all sides, i.e. on the head faces and the longitudinal sides, of the substantially rectangular elements.

According to the invention, locking may be accomplished by at least one spring element which is attached to one of the elements and which can be pivoted during the joining motion behind a locking edge of the other element extending substantially in the horizontal direction. The two elements are secured against displacement in the vertical direction, i.e. perpendicular to the installation plane, because the locking edge extends substantially in the horizontal direction. Additional locking strips may be provided on the elements to effect, in addition to locking in the vertical direction, also locking in the installation plane.

When adjacent elements are joined, the spring element slides on a supporting surface of the adjacent element facing the locking edge. The supporting surface is inclined with respect to the installation plane and oriented towards the locking edge. Due to the slope of the supporting surface, a free lower end of the spring element slides from a higher region of the supporting surface to a lower region, i.e. a region located farther away from the top side of the element, with the result that the spring element is horizontally displaced depending on the slope. The smaller the slope, the greater is the horizontal displacement. The slope is matched to the contour of the spring element so that the spring element engages behind the locking edge substantially without play, catching and/or interlocking the elements in this way. The slope is in a range from 10° to 60°, in particular in a range from 15° to 30°, with respect to the installation plane.

Alternatively or optionally, the supporting surface extends in parallel with the installation plane, and the free end of the spring element has a baffle or rounding, so that the free end is inclined relative to the installation plane, thereby causing a horizontal displacement of the spring element behind the locking edge when adjacent elements are joined.

The spring element constructed according to the invention therefore need not at first overcome a spring force for locking, for example when the spring element is pushed back from the adjacent side of the element. Instead, the spring element is exclusively displaced in the direction of the adjacent element. The spring element therefore does not snap in place behind the locking edge in response to a spring force, but is forcibly guided and urged behind the locking edge. Advantageously, an excessively large clearance space is then not required on the back side of the spring element facing the core of the element, because the spring element is during locking only displaced in one direction and is not pushed by the locking edge in the direction of the clearance space. The spring element is hence displaced exclusively in the direction of the adjacent element. This reduces the machining complexity on the rear side of the spring element. The loss of material and the machining costs can be reduced.

The spring element is in the locking position clampingly held between the locking edge and the supporting surface. The spring element is unable to return automatically, because it is supported on the supporting surface. Preferably, the spring element is in a self-locking state, which is caused by the friction of the free end of the spring element on the supporting surface and the clamping behind the locking edge. The spring element can then not return to its initial position without applying an external force, so that the elements are safely retained in the locking position, i.e. in the locking plane. In addition, a profiled section which increases friction may be provided on the spring element and/or preferably on the supporting surface. Instead of a profiled section, a defined detent location may be formed on the supporting surface, in which the spring element engages or which is engaged from behind in the locking position, preventing the spring element from sliding out of the locking position unassisted. With a raised detent location, behind which the spring element is to engage, a somewhat greater force must be applied immediately before crossing the detent location. With a recessed detent location, the supporting surface must have an upward ramp to the detent location and finally expand at the detent location. The increasing force is therefore rather continuous until the spring element snaps into this detent location. In any event, a haptic and optionally acoustic feedback is provided to the installer by a defined detent location, i.e. a specific pressure point, when installing or mounting the elements, confirming that the elements are indeed locked. This simplifies the installation. Preferably, only the end of the spring element adjacent to the top side of the elements is connected with the element. The lower, free end of the spring element facing away from the top side is therefore not connected with the element and can be pivoted about a horizontal pivot axis located at the upper end of the spring element. For this purpose, a clearance space is provided behind the spring element, which may extend at a right angle or inclined with respect to the top side of the floor covering element.

Within the context of the invention, a spring element may be constructed as a one-piece component of the element. This means that the spring element is machined from the core of the element. This can be accomplished with a clearance space on the backside of the spring element and a corresponding exposed lower, free end of the spring element.

If the attachment on the upper end of the spring elements is not too thick, then the spring element is articulated in the region of the upper end, whereas the lower, free end has a corresponding protrusion which engages behind the locking edge. The lower end of the spring element is therefore at least in certain regions thicker than the upper end of the spring element, in particular thicker than an articulated region between the spring element and the element. The thickness refers to the extent in the installation plane in the direction to the complementary profiled section of the adjacent element.

To improve the agility of the spring element, at least one squeeze gap is advantageously provided on the side of the spring element towards which the spring element is bent. The squeeze gap is smaller when the spring element is angled. Stress peaks are reduced by the squeeze gap and the spring element does not detach in a one-piece configuration. Several parallel squeeze gaps may be provided for further increasing the deformability of the spring element.

Squeeze gaps may be filled, at least partially or even completely, with an elastic material having a greater elasticity than the spring element. The elastic material may be an adhesive, for example a hot melt adhesive, also an elastomer, preferably a reactive material based on polyurethane, acrylic, rubber or silicone. All these materials are commonly known as reactive adhesives or potting materials having high elasticity and/or elongation. When using flexible materials, the spring element remains connected to the element in the articulated region even when the spring element breaks and does not detach from the element. This also allows the elements to be removed and placed multiple times, without impairing the locking function. The elastic material is therefore in particular a hot melt.

According to another embodiment, the at least one squeeze gap has opposing walls which are coated with the elastic material at least partially, in particular over the full surface, wherein the coatings of the elastic material are spaced from each other when the elements are unlocked and contact each other when the elements are locked.

This contact can be used to adhesively bond the coatings with one another. Adhesive bonding can occur through the so-called plasticizer migration between the two coatings. Alternatively, the adhesive layer may also be chemically adjusted so that it quasi hardens or sets before installation. However, if the opposite coatings make contact under pressure, cohesion forces may be produced that cause the two coatings to adhere to each other. However, different elastic materials may be used which are functionally separated and form a hinge on the spring element, with an additional elastic material being provided primarily for adhesively joining the opposing coatings.

Advantageously, the rear clearance space behind the spring element may be at least partially filled so that the adhesive, the elastomer or the reactive adhesive connects the spring element to the core. The squeeze gap may be filled additionally or alternatively to filling of the clearance space and may also consist of one of the aforementioned elastomers, adhesives, reactive adhesives or hot melts. Filling the clearance space ensures a secure connection of the spring element to the element, in particular in a situation where a spring element that is machined as one-piece from the core breaks in the region of the squeeze gap. Within the context of the invention, the spring element may also be produced as a separate component which is attached to the element in a dedicated process step. The attachment may be non-positive and/or positive and/or with an adhesive. Advantageously, when attached with an adhesive, the adhesive joint may simultaneously form a hinge between the element and the spring element.

Furthermore, when the spring element is formfittingly attached, a foot may be provided which is held in a recess of the element. In particular, this foot may be disposed in a recess extending in the installation plane. The foot may be implemented as a clamping strip or clamping pin, depending on the width of the spring element. A constriction for forming a hinge may exist between the foot and the spring element. If the foot and the spring element are separate components, the hinge may be formed from an elastic adhesive material, an elastomer, an reactive adhesive or hot melt disposed between the spring element and the foot. The adhesive is hereby preferably once more a hot melt.

In principle, the spring element may be produced as a separate component, for example from plastic by an injection molding process, wherein the spring element can hereby be individually configured with different wall thicknesses, so that for example film hinges, which allow an easy displacement of the spring element with respect to the foot of the spring element, may be realized with the injection molding process. Alternatively, plastic materials produced with an extrusion processes or with a co-extrusion process may also be used. The production method thus depends, among others, on the selected geometry, the wall thickness and the material composition of the spring element.

In theory, only a single pivotable spring element in form of a strip may be provided, if an element were only vertically laid down; however, advantageously several spring elements that can be pivoted independent from each other may be arranged on one side of an element. This allows not only substantially vertical placement of the element, but also angling or pivoting the elements without causing jamming; for example, first edges of the heads sides engage with one another in the head face region, whereafter by further pivoting the element to be attached, finally both head sides extend parallel to each other and fully engage with each other. Because a single long spring element may nonuniformly distribute the load during pivoting, leading to stress within the spring element, several individual spring elements may advantageously be provided which are operated with a mutual time offset. The spring elements may hereby abut each other or be spaced apart from each other.

Advantageously, more than one spring element is provided for each side. It would also be feasible to arrange spring elements having different elasticities on one side, thereby enabling a stepped latching process. The spring elements may therefore also be arranged with a spacing therebetween. When the spring elements and the element together are constructed as one-piece, several slots may be formed in the spring elements, allowing them to be pivoted sequentially.

Alternatively, adjacent spring elements may be connected with one another for relative movement to one another. An elastic component, for example an elastic adhesive, may be used as connecting means, as is also used in the squeeze gap or in the rear clearance space. The spring elements can be designed smaller with the elastic joint, without risking that a single spring element detaches from the element when damaged. The design latitude is fundamentally greater when the spring elements are additionally connected to the element with an adhesive.

In an advantageous embodiment, the element having the locking edge includes a locking strip gripping underneath the element supporting the spring element. This locking strip is configured to secure adjacent elements against tensile loads in an installation plane. With the additional locking strip, only horizontal tensile forces are absorbed, i.e. tensile loads in the installation plane. This ensures that no joining gap remains on the top surface. This prevents liquids and contamination from entering any existing gaps.

In particular with wall coverings, the locking strip can also be attached on a substructure, in particular a wall-side substructure. For example, the locking strip may be secured on the substructure by a fasting means in form of a clip. The locking strip may also be directly screwed, nailed or stapled, i.e. without an additional clip.

The material for the spring element may be a wood material, i.e. wood or a material containing wood fibers or a material produced from wood as a base material, for example liquid wood. Metals and metal alloys as well as composite materials can be used for the spring elements. Mixed plastic materials can be used as well as materials based on thermoplastics or duroplastics. The spring element may also be formed from a fiber-reinforced plastic.

The concept of the invention may be applied to all floor systems and wall systems, wherein a top covering is arranged on a support, in particular a wood-based board, for example an MDF board or chipboard, for example real wood coverings, laminate, supports with varnished surfaces as top covering, linoleum, cork on support boards, etc. In particular, the cover layer may consist of a decorative paper with overly which determines the appearance of the elements. The floor covering may therefore be a parquet floor, a prefinished parquet floor, a real wood floor or a laminate floor. Also suitable are elements made of solid materials, for example timber floor boards, wood elements, cast boards made of plastic, plastic materials, shaped parts or gypsum boards. The concept of the invention does not only relate to the joining of elements, but one element may also be constructed, as previously mentioned, as a frame component for frame floors or double floors. In this type of application, one of the elements to be joined is configured as a panel and a second element as a frame component. During assembly, the panel is placed in the frame construction made of one or several frame components and locked with its head faces and/or longitudinal sides.

The subject matter of the invention is also a method for producing an element, wherein a clearance space behind the spring element is used to attach the spring element. The method for producing an element, in particular a panel, includes the following steps:

forming the spring element out of the element by introducing a clearance space on a backside of the spring element;

at least partially filling the clearance space with an elastic material extending from the backside of the clearance space to the core of the element, for joining the spring element with the core;

separating the spring element from the element, so that it is only held by the elastic material on the core.

This approach has the advantage that the spring element which is initially connected as one-piece to the element, in particular to a panel, can be machined with high precision from the solid material, i.e. from the core. The position of the spring element is maintained even when the elastic material is introduced into the clearance space. In particular, the elastic material is an adhesive material which preferably quickly hardens, without becoming brittle. Preferably, a one- or two-component reactive adhesive is used. In a third step, the spring element, which is still formed as one-piece with the element, can be separated from the element by a separation process.

Alternatively, the spring element can also be attached on the core of the element above the spring element. The method for this approach includes the following steps:

forming the spring element by introducing a squeeze gap in form of a notch, which extends with a spacing from the top side of the element and above the spring element;

at least partially filling the squeeze gap with an elastic material extending from the top side of the spring element to the core of the panel, to join the spring element to the core of the element;

separating the spring element from the element by introducing a clearance space on a backside of the spring element, so that it is only held on the core by the elastic material.

The position of the spring element does not change in either method, because it remains connected to the core by the elastic material. The separation step occurs only at a location where the spring element was initially connected to the element in one piece. The spring element is now a separate component which was machined from the element with the desired shape and remains in its initial position through position-fixing means.

Alternatively, the element may also be produced in the following manner:

forming the spring element by introducing a squeeze gap in form of a notch, which extends with a spacing from the top side of the element and above the spring element, and introducing a clearance space on the backside of the spring element, wherein first the squeeze gap or first the clearance space can be formed;

at least partially filling the squeeze gap with an elastic material extending on two opposing walls of the squeeze gap to additionally join the spring element to the core of the element;

widening the clearance space in the direction of the backside of the spring element, so that the spring element is connected to the core either only via the elastic material or primarily via the elastic material over an area.

In this third embodiment, the squeeze gap has in particular a V-shaped configuration and has on its opposing walls a coating made of the elastic material. This coating should harden very quickly, because hardening occurs inside the profile line where the process takes place at high feed rates. By widening the rear clearance space when applying the elastic material, the groove bottom of the squeeze gap is not yet sufficiently stable. The stability of the hinge or the strength of the attachment of the spring element to the core can be specifically adjusted by a specific widening of the clearance space only after the groove bottom of the squeeze gap has become sufficiently strong.

These methods are significantly more accurate than to produce spring elements separately and to connect the spring elements adhesively to the element by using suitable positioning aids. Moreover, tighter manufacturing tolerances and higher quality standards can be maintained.

BRIEF DESCRIPTION OF THE DRAWING

The invention will now be described in more detail with reference to exemplary embodiments illustrated in the schematic drawings for connecting two elements in form of panels. It will be understood that the illustrated connections can also be applied to the connection between a frame component of a frame construction and a panel.

FIGS. 1 to 3 each show a cross-section through the connection region of two adjacent elements in different installation positions, wherein FIG. 1 shows the still unlocked position and FIG. 3 shows the locked position;

DETAILED DESCRIPTION OF PREFERRED EMBODIMENTS

Figure 1:
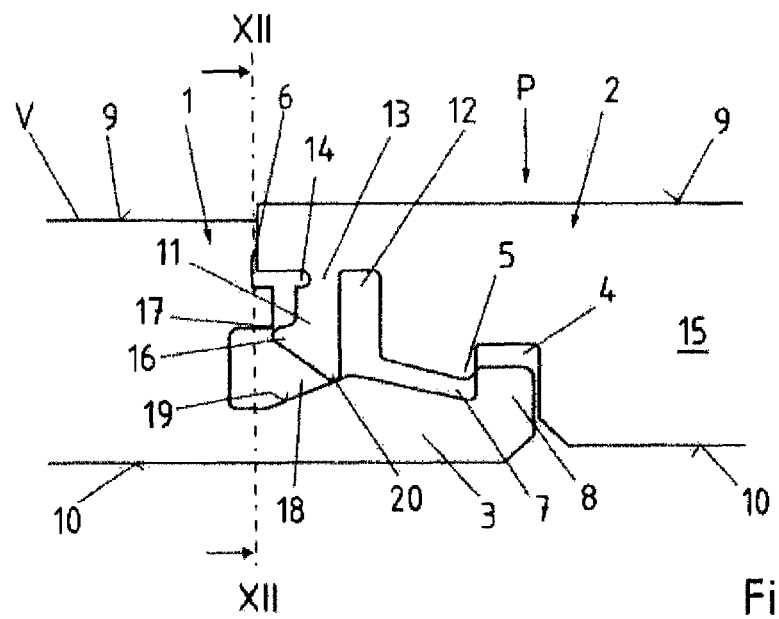

FIG. 1 shows a cross-section through two elements 1, 2 in form of panels. This can be a longitudinal or head-side cross-section of the elements 1, 2. The elements 1, 2 are constructed identically, so that the elements 1, 2 can be assembled to a floor covering. FIG. 1 shows two adjacent elements 1, 2 before locking. The diagram of the left-hand side shows a first element 1 and on the right-hand side a second element 2 configured to be connected to the first element 1. The first element 1 has a locking strip 3 and the second element 2 has a coupling channel 4 which is open towards the bottom and a coupling bead 5 connected to one end. The locking strip 3 of the first element 1 protrudes from a head face which in this exemplary embodiment is only referred to as side 6. Element 2 is arranged opposite element 1 such that when the second element 2 is lowered in the direction P of the arrow, the coupling bead 5 of the second element 2 engages with the coupling channel 7 of the locking strip 3 and the coupling channel 4 of the second element 2 engages with the coupling bead 8 of the locking strip 3. This region of the elements 1, 2 is specifically used to orient the position in the horizontal plane, whereby in the context of the invention horizontal corresponds to the installation plane V, which coincides with the mutually parallel top surfaces 9 and bottom surfaces 10 of the elements 1, 2.

Figure 2:
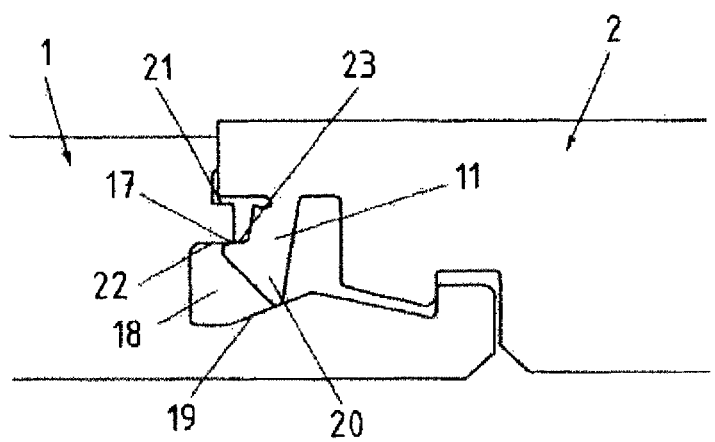
Figure 3:
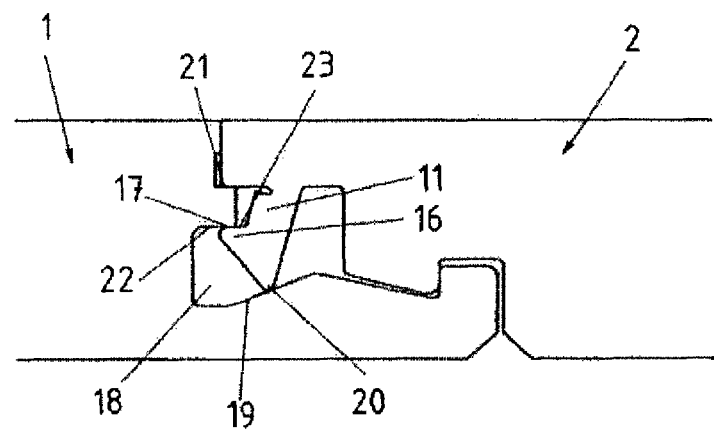

However, an important component of the profiled section according to the invention is a spring element 11. The spring element is essentially a tongue oriented substantially downward, i.e. away from the top surface 9, with the tongue being formed by a rectangular clearance space 12 to the core 15 of the element 2. A top end 13 of the spring element 11 is connected to the element 2. As can be seen, a squeeze gap 14 in form of a narrow notch is arranged on the side facing away from the clearance space 12. As seen in FIGS. 2 and 3, the squeeze gap is constructed to become narrower when the spring element 11 is displaced in the horizontal direction, i.e. towards the side 6 of the other element 9. The squeeze gap 14 is a constriction which decreases the thickness of the spring element 11 and renders the top end 13 of the spring element 11 movable with respect to the core 15.

Another important element of the spring element 11 is a protrusion 16 pointing toward the other element 1 and configured to engage behind a locking edge 17 of the other element 1. For this purpose, a groove 18 configured to receive the protrusion 16 is provided in the other element 1.

In addition, a supporting surface 19, on which the lower free end 20 of the spring element 11 is supported, extends into the groove 18 or a lower groove wall of the groove 18. The supporting surface 19 is inclined with respect to the installation plane V, i.e. with respect to the horizontal. The supporting surface 19 is here a straight line with the slope of about 20° with respect to the installation plane V. The supporting surface 19 may also have a concave curvature. In addition, the supporting surface 19 in this embodiment has an indented detent location 29 in form of a groove.

The spring element 11 can, when displaced in the direction of the arrow P, i.e. when the element 2 is lowered, only slide on the supporting surface 19 commensurate with the slope. The spring element 11 then bends in the region of the squeeze gap 14, so that the protrusion 16 is guided behind the locking edge 17.

FIG. 2 shows the spring element 11 in an intermediate position, before it reaches the end position illustrated in FIG. 3. In the end position, the two top sides 9 of the elements 1, 2 are in the same horizontal plane. There is no longer an offset. As can be seen, the right element 2 cannot be lowered farther. It is supported on a console 21 of the first element 1 which is still above the locking edge 17. This console 21 is located relatively close to the top side 9, so that a force applied to the right element 2 in the image plane is introduced into the left element 1 on the shortest possible path. This minimizes a possible height offset.

As also seen in FIG. 3, the coupling bead 5 is almost completely located behind the coupling bead 8 of the locking strip 3 in the locked position, thus providing a secure lock in the horizontal direction.

The supporting surface 19 is configured so that the end 20 of the spring element 11 is guided into the indented detent location 29 during locking, where it is then able to lock. The position of the spring element 11 is then fixed in the indented detent location 29, thereby securely clamping the protrusion 16 behind the locking edge 17.

The upper groove wall 22 of the groove 18, which terminates in the locking edge 17, extends in the installation plane V, i.e. in the horizontal direction. A catch surface 23 on the protrusion 16 of the spring element 11 also extends horizontally in the locked position, i.e. in the installation plane V. When a vertical force is applied to the left element 1 in the image plane, a sufficiently large support force, which is transferred to the right element 2, can be introduced into the spring element 11 via this catch surface 23.

Figure 4:
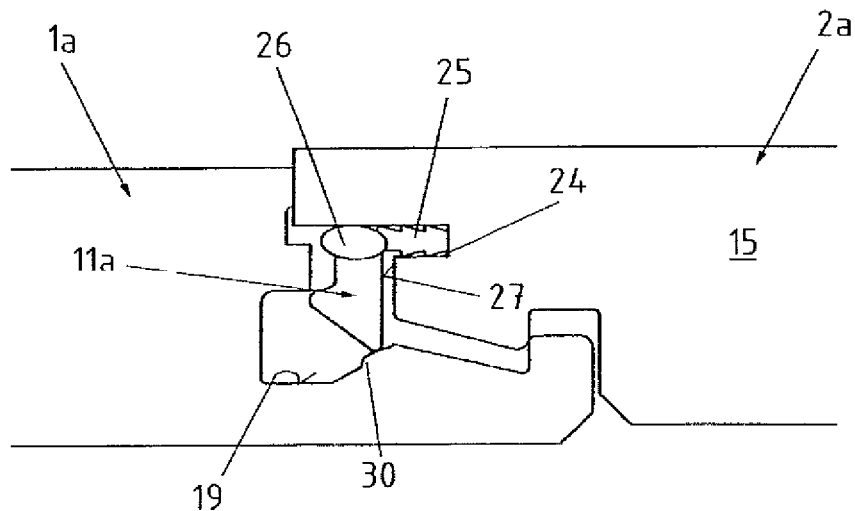
FIGS. 4 and 5 each show a cross-section through the connection region of two adjacent elements in different installation positions by using another embodiment of a spring element.

The embodiment of FIG. 4 is different from that of FIG. 1 in that a spring element 11a is used which was not produced from the element 2a as one piece, but was inserted in a separate production steps. The operation as such is almost identical to that of FIGS. 1 to 3, so that reference is made to the previous description and the reference symbols used in the FIGS. 1 to 3. Unlike FIGS. 1 to 3, the supporting surface 19 has here a raised detent location 30. During locking, the end 20 of the spring element 11a is pressed across the detent location 30 and comes to rest with its backside 27 behind the detent location 30.

Figure 5:
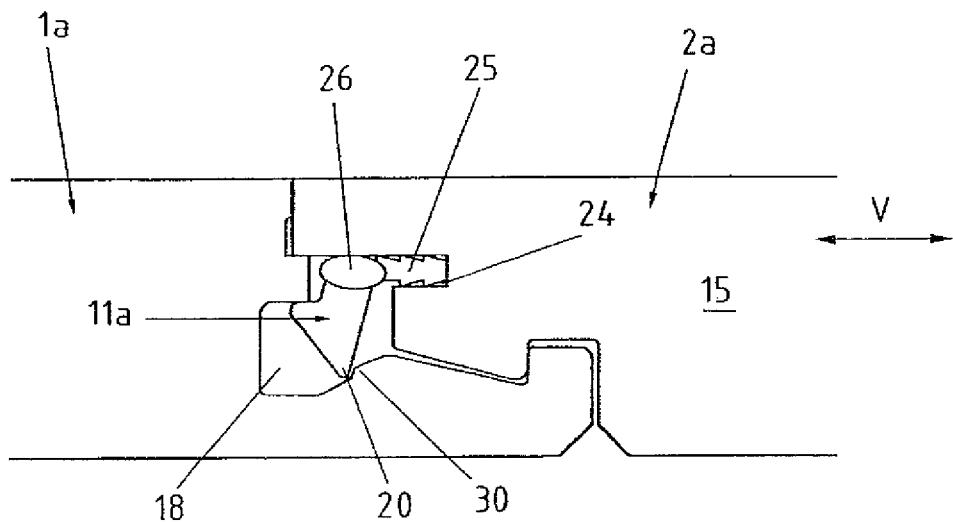

The spring element 11a has a foot 25 disposed in a receptacle 24 extending in the horizontal direction, i.e. in the installation plane V. A hinge 26 is connected to this foot 25. The hinge 26 allows the spring element 11a to pivot relative to the right element 2a in the image plane. The hinge 26 can be formed from an elastic adhesive that connects the spring element 11a to the foot 25. The foot 25 itself can have a matching profiled section and is thus non-positively retained in the receptacle 24. FIG. 5 shows the entire arrangement with the spring element 11a in the locked position.

Figure 6:
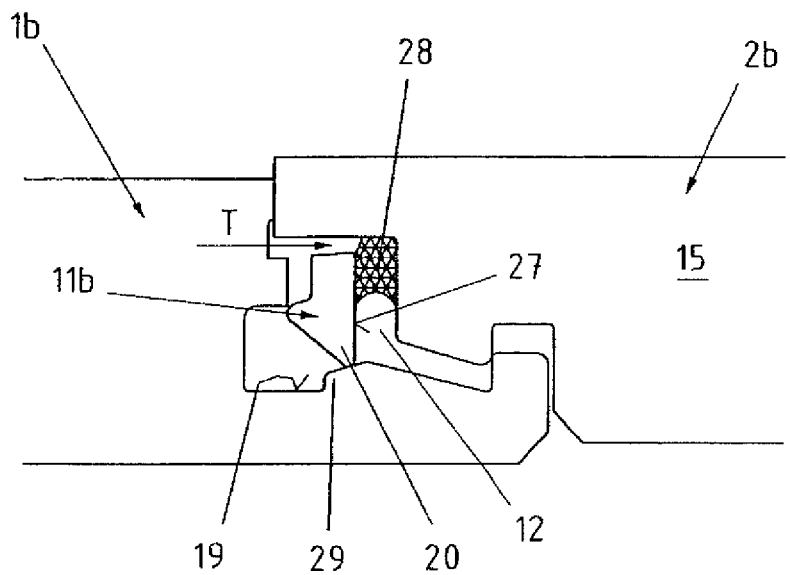
FIGS. 6 and 7 each show a cross-section through the connection region of two adjacent elements in different installation positions by using another embodiment of a spring element.

FIG. 6 shows another embodiment in which, unlike in FIG. 1 and FIG. 4, a spring element 11b is used which is connected to the element 2b with an adhesive. A clearance space 12 formed on the backside 27 of the spring element 11b is partially filled with an elastic material or adhesive 28, which is then hardened. The spring element 11b is thereafter separated from the element 2b by a separation cut T oriented horizontally with respect to the image plane.

The position of the spring element 11b does not change, because it remains connected to the core 15 by the elastic material or adhesive 28. The connection between the spring element 11b is elastic and the function itself is identical to that in FIGS. 1 to 3 and 4 to 5, so that reference is made to the previous discussion and the previously introduced reference symbols.

Figure 7:
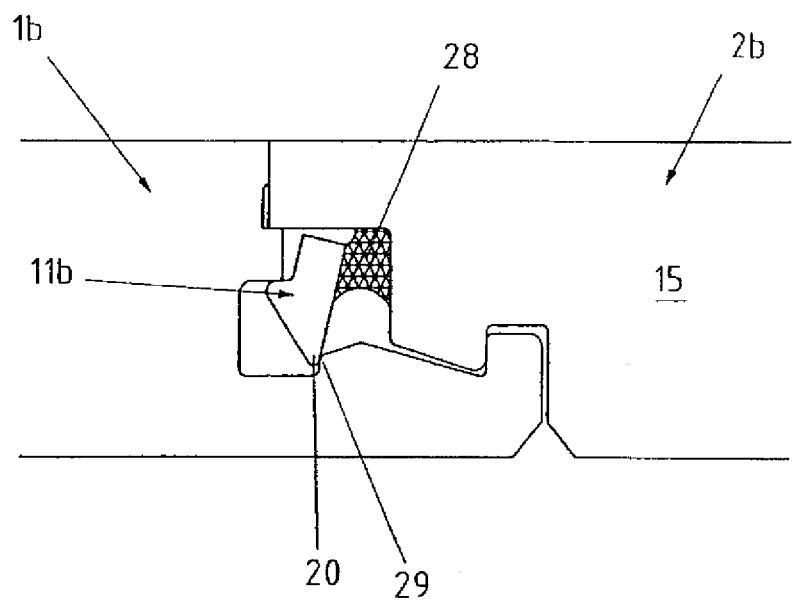

The spring element 11b grips in a locked position, illustrated in FIG. 7, with its end 20 behind a detent location 29 similar to FIGS. 1 to 3, with the difference that the detent location 29 is hereby configured as a kind of step in the supporting surface 19. After locking, the backside 27 of the spring element 11b is pulled against the detent location 29 by the restoring forces of the elastic material or adhesive 28.

Figure 8:
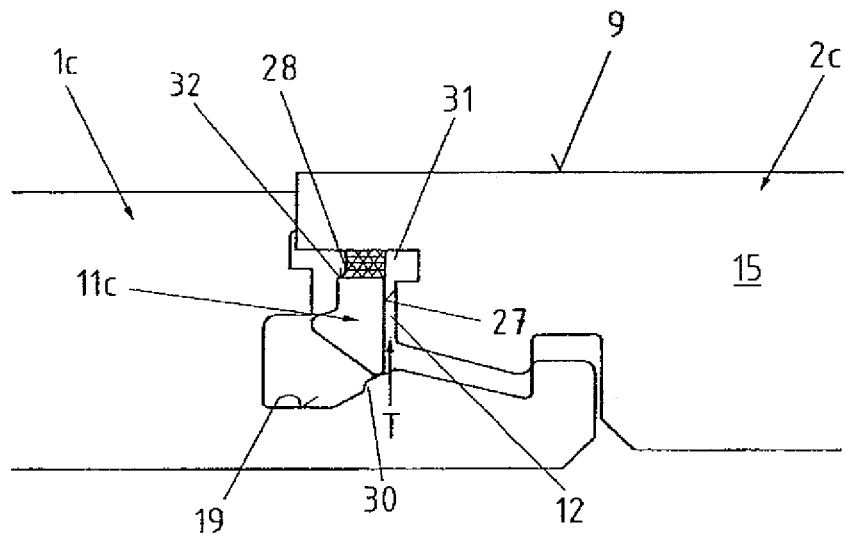
FIGS. 8 and 9 each show a cross-section through the connection region of two adjacent elements in different installation positions by using another embodiment of a spring element.
Figure 9:
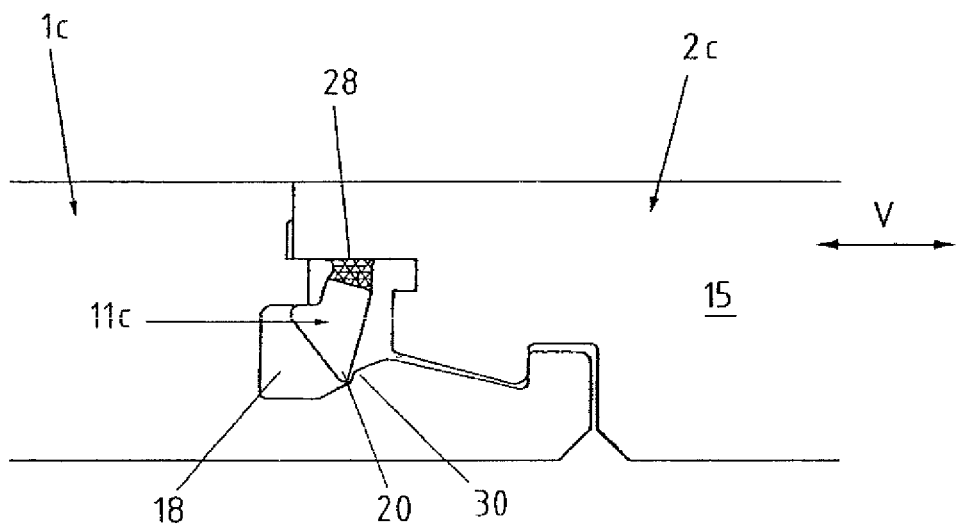

FIG. 8 shows another embodiment, wherein unlike in FIG. 1 and FIG. 4, a spring element 11c is used which is connected to the element 2c with an adhesive. A squeeze gap 31, which extends at with a spacing from the top side 9 of the element 2c and above the spring element 11c, is herein introduced above the spring element 11c horizontally in the image plane. In the illustrated embodiment, the squeeze gap 31 extends substantially parallel to the top side 9 of the element 2c. The squeeze gap 31 is partially filled with an elastic material or adhesive 28 which extends from a top sides 32 of the spring element 11c to the core 15 of the element 2c. The spring element 11c is thereafter separated from the element 2c by a separation cut T on the backside 27 of the spring element 11c, vertical in the image plane.

The position of the spring element 11c remains unchanged, because it remains connected to the core 15 by the elastic material or adhesive 28. The connection between the spring element 11c is elastic and the functionality itself is identical to that in FIGS. 1 to 3 and 4 to 7, so that reference is made to the previous description and the previously introduced reference symbols.

Figure 10:
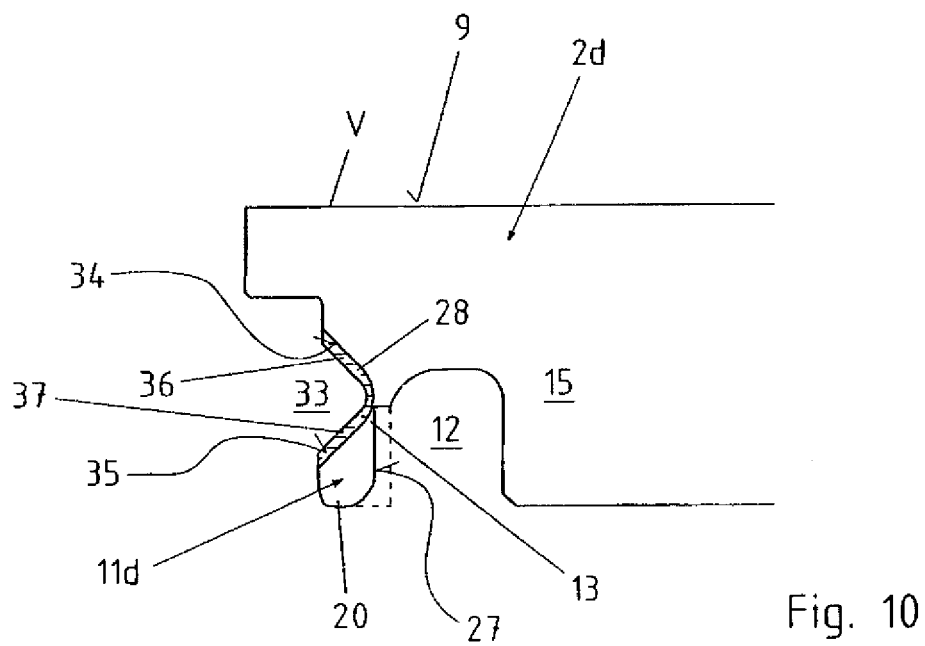
FIGS. 10 and 11 each show a cross-section through the connection region of two adjacent elements in different installation positions by using another embodiment of a spring element.
Figure 11:
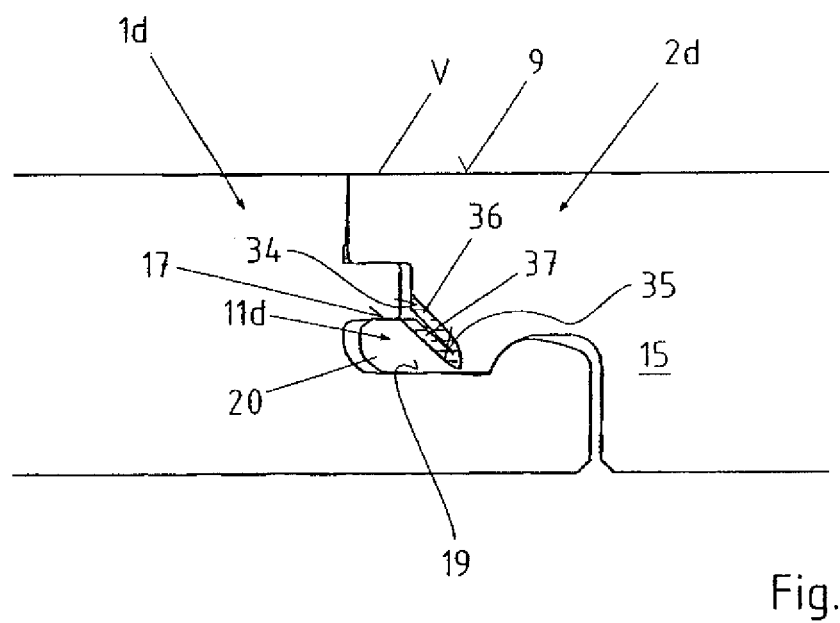
Figure 12:
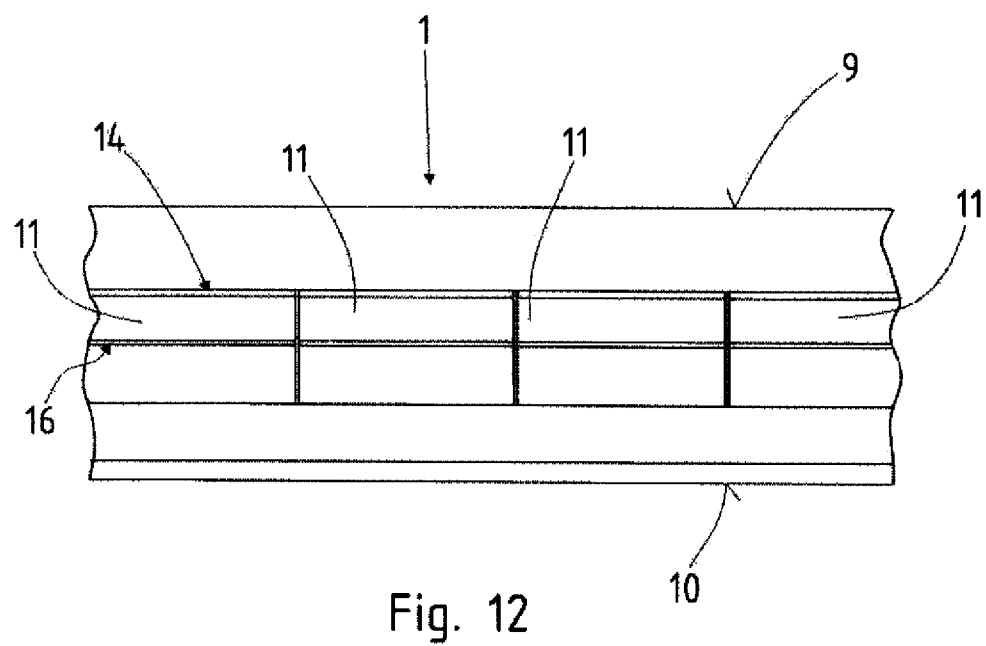
FIG. 12 shows a sectional view of the embodiment of FIG. 1 taken along the line XII in the direction of the arrows of FIG. 1.

FIGS. 10 and 11 show another embodiment, wherein a V-shaped squeeze gap 33 with relatively large mouth angles is provided. The squeeze gap 33 has opposing walls 34, 35 which transition into each other via an arcuate squeeze gap bottom. The squeeze gap 33 is partially filled with the elastic material 28 which is applied on the opposing walls 34, 35 in form of coatings 36, 37. The previously described clearance space 12 is located on the spring element 11d facing the core 15, which is first removed with the exception of the region of the spring shown by a dashed line. The clearance space 12 is widened in the direction of the backside 27 of the spring element 11d only after the elastic material 28 has been introduced into the squeeze gap 33 and hardened or at least partially hardened, giving the spring element 11d the illustrated final contour. The free end 20 of the spring element is also rounded towards its backside 27 to allow it to slide on the supporting surface 19 which in this exemplary embodiment extends parallel the installation plane V.

As in the previous embodiments, the spring element is horizontally deflected about the hinge located in the region of the bottom of the squeeze gap 33 and displaced towards the left in the image plane for locking. The coatings 36, 37 made of the elastic material 28 then approach each other and come at least partially into contact with each other. The opposing coatings 36, 37 are then at least partially glued together. Otherwise, reference is made to the description of FIGS. 1 to 9.

What is claimed is:

1. A covering made from mechanically interconnectable elements, wherein at least one of the elements is a panel, the elements comprising:
    matching profiled sections arranged on opposing sides of a panel and configured for interlocking adjacent elements in a horizontal and vertical direction by a substantially vertical joining motion or a pivoting joining motion,
    at least one spring element hinged on one of the elements and configured for pivoting during the joining motion behind a locking edge of the adjacent element, said locking edge extending substantially in the horizontal direction wherein the element has a top side and an end of the at least one spring element adjacent to the top side is connected to the element,
    a supporting surface arranged on the adjacent element facing the locking edge and configured to enable the at least one spring element to slide on the supporting surface,
    wherein the supporting surface is inclined toward the locking edge with respect to an installation plane, causing a horizontal displacement of the at least one spring element behind the locking edge wherein the at least one spring element contacts the locking edge, or
    wherein the supporting surface extends parallel to the installation plane and a free end of the at least one spring element is inclined with respect to the installation plane, thereby causing a horizontal displacement of the at least one spring element behind the locking edge wherein the at least one spring element contacts the locking edge when adjacent elements are joined.

2. The covering of claim 1, wherein the at least one spring element is displaced exclusively toward the adjacent element.

3. The covering of claim 1, wherein the at least one spring element is clampingly retained in a locked position between the locking edge and the supporting surface.

4. The covering of claim 1, wherein the at least one spring element is a component formed as one piece with the element.

5. The covering of claim 1, wherein the at least one spring element comprises at least one squeeze gap.

6. The covering of claim 5, wherein an elastic material, which has a greater elasticity than the at least one spring element, is disposed in the at least one squeeze gap.

7. The covering of claim 6, wherein the at least one squeeze gap has mutually opposing walls which are at least partially coated with the elastic material, wherein coatings on opposing walls are spaced apart in an unlocked state and are in contact with each other in an interlocked state.

8. The covering of claim 6, wherein the opposing walls are coated with the elastic material over an entire wall surface.

9. The covering of claim 7, wherein the coatings on opposing walls adhesively bond with each other when in contact.

10. The covering of claim 1, wherein the element comprises a core and wherein a backside of the at least one spring element faces the core, wherein an elastic material is disposed at least partially in a clearance space disposed between the core and the backside of the at least one spring element, said elastic material connecting the at least one spring element to the core.

11. The covering of claim 10, wherein the elastic material is an adhesive.

12. The covering of claim 1, wherein the at least one spring element is formed as a separate component that is attached on the element.

13. The covering of claim 12, wherein the at least one spring element is adhesively bonded to the element by an adhesive joint forming a hinge between the element and the at least one spring element.

14. The covering of claim 12, wherein the element comprises a receptacle and the at least one spring element comprises a foot, wherein the foot is retained in the receptacle.

15. The covering of claim 14, further comprising a hinge arranged between the foot and the at least one spring element.

16. The covering of claim 15, wherein the hinge is made of a material having a greater elasticity than a material of the at least one spring element.

17. The covering of claim 1, wherein several independently pivotable spring elements are arranged on one side of an element.

18. The covering of claim 17, wherein adjacent spring elements are connected with each other by an elastic component for relative movement to one another.

19. The covering of claim 1, wherein the element having the locking edge comprises a locking strip which grips underneath the element carrying the at least one spring element and which is configured to secure adjacent elements against tensile loads in the installation plane.

20. The covering of claim 1, wherein at least one element is constructed as a frame component for a frame structure.

21. A method for producing the element for the covering made from mechanically interconnectable elements of claim 10, comprising the steps of:
    forming the at least one spring element from the element by introducing the clearance space on the backside of the at least one spring element;
    at least partially filling the clearance space with the elastic material extending from the backside of the at least one spring element to the core of the element to thereby connect the at least one spring element to the core; and
    separating the at least one spring element from the element so that the at least one spring element is retained on the core only by the elastic material.

22. A method for producing the element for the covering made from mechanically interconnectable elements of claim 10, comprising the steps of:
    forming the at least one spring element by introducing a squeeze gap, with the squeeze gap extending with a spacing from a top side of the element and above the at least one spring element;
    at least partially filling the squeeze gap with the elastic material extending from the top side of the at least one spring element to the core of the element, so as to connect the at least one spring element to the core of the element;
    separating the at least one spring element from the element by introducing the clearance space on the backside of the at least one spring element, so as to retain the at least one spring element on the core exclusively by the elastic material.

23. A method for producing the element for the covering made from mechanically interconnectable elements of claim 10, comprising the steps of:

forming the at least one spring element on the element by introducing a squeeze gap, which extends with a spacing from a top side of the element and above the at least one spring element, and by introducing the clearance space on the backside of the at least one spring element;

at least partially filling the squeeze gap with the elastic material extending on two opposing walls of the squeeze gap, so as to connect the at least one spring element to the core of the element;

widening the clearance space toward the backside of the at least one spring element, thereby connecting the at least one spring element to the core only via the elastic material.

24. The method of claim 23, wherein the at least one spring element is connected to the core over an area via the elastic material.

* * * * *